(12) United States Patent
Larson et al.

(10) Patent No.: US 8,366,012 B2
(45) Date of Patent: Feb. 5, 2013

(54) AUTOMATIC TEMPERATURE CONTROL WITH SIMPLIFIED MICROPROCESSOR INTERFACE

(75) Inventors: Eric K. Larson, Cumberland, RI (US); David C. Gill, North Providence, RI (US); Juan J. Barrena, Johnston, RI (US); Mark A. Romo, Paw Paw, MI (US)

(73) Assignee: Illinois Tool Works Inc., Glenview, IL (US)

( * ) Notice: Subject to any disclaimer, the term of this patent is extended or adjusted under 35 U.S.C. 154(b) by 278 days.

(21) Appl. No.: 12/944,228

(22) Filed: Nov. 11, 2010

(65) Prior Publication Data

US 2011/0049251 A1    Mar. 3, 2011

Related U.S. Application Data

(62) Division of application No. 12/139,619, filed on Jun. 16, 2008, now Pat. No. 7,886,982.

(60) Provisional application No. 60/944,222, filed on Jun. 15, 2007.

(51) Int. Cl.
*G05D 23/13* (2006.01)
*D06F 39/04* (2006.01)

(52) U.S. Cl. .......................... 236/12.1; 68/12.21; 68/12.22

(58) Field of Classification Search .................. 236/12.1; 68/12.19, 12.21, 12.22, 12.03, 12.23; 134/57 R; 374/163; 8/158; 318/446
See application file for complete search history.

(56) References Cited

U.S. PATENT DOCUMENTS

| 6,003,536 A | 12/1999 | Polverari et al. |
| 6,097,170 A | 8/2000 | Larson |

*Primary Examiner* — Chen-Wen Jiang
(74) *Attorney, Agent, or Firm* — Boyle Fredrickson, S.C.

(57) ABSTRACT

An automatic temperature control for a washing machine or the like may adopt in a first embodiment a single triac switched between a hot-water valve and cold-water valve by mechanical switch elements to provide for a range of temperature control via a microprocessor receiving a temperature command input. In a second embodiment two triacs may be used to permit a range of temperature controls to be effected by voltage signals generated by low-voltage low current switches implemented on an integrated circuit board.

9 Claims, 5 Drawing Sheets

AUTOMATIC TEMPERATURE CONTROL WITH SIMPLIFIED MICROPROCESSOR INTERFACE

CROSS-REFERENCE TO RELATED APPLICATIONS

This application is a divisional application of U.S. application Ser. No. 12/139,619 filed Jun. 16, 2008 now U.S. Pat. No. 7,886,982 claiming the benefit of U.S. provisional application 60/944,222 filed Jun. 15, 2007, both hereby incorporated by reference.

BACKGROUND OF THE INVENTION

The present invention relates to automatic temperature controls for washing machines, such as clothes washing and dishwashing machines, and in particular to an automatic temperature control employing a single solid-state switch.

Current high-efficiency washing machines may provide for precise control of water temperature to ensure thorough cleaning while limiting energy consumption. Such systems typically employ a temperature sensor monitoring the temperature of the water received by the wash chamber as a mixed output from two solenoid valves, one receiving water from a hot-water line, and the other receiving water from a cold-water line. By controlling the relative proportion of time that each solenoid valve is on, and monitoring the mixed water, a precise water temperature may be produced. Precise control of water temperature can minimize the amount of hot-water required and hence increase the energy efficiency of the appliance.

Solenoid valves provide only two states: fully on or fully off, but they may be switched between these states or "duty cycle modulated" to control the relative proportion of water passed by each valve and thus to provide an arbitrary temperature of water. Solid-state switching devices, such as triacs, are used to control the high current necessary to switch the valve with low powered signals from a microprocessor. The microprocessor may read in the temperature from a temperature sensor, typically a thermistor, and control the actuation of two output lines leading to two triacs, one associated with each water valve.

SUMMARY OF THE INVENTION

The present invention provides an automatic temperature control circuit for washing machines that eliminates one solid-state switch (triac) eliminating the cost of this device and further allowing the use of a microprocessor with one fewer output lines, allowing a lower-cost microprocessor to be used. By significantly decreasing the cost of precise temperature control, high-energy efficiency can be available in a larger range of washing machines.

The ability to rely on a single solid-state switch exploits the recognition that for a given control temperature, typically one valve will be fully on. Thus, for higher temperatures, typically the hot valve will be continuously open with the cold valve intermittently controlled, while for lower temperatures, typically the cold valve will be continuously open with the hot valve intermittently controlled. The present invention therefore provides a standard electromechanical steering switch to route control of the power from a single triac, the single valve subject to intermittent control, with the other valve turned on constantly by a switch contact. The use of this steering electromechanical switch eliminates one triac and one output line from the microprocessor.

Specifically, the present invention provides an automatic temperature control for a washing machine delivering controlled temperature water to a washing chamber by control of a hot-water valve connected to a hot-water line and a cold-water valve connected to a cold-water line, the outputs of the hot-water valve and cold-water valve mixed provide a desired temperature of water to the washing chamber. The automatic temperature control includes an electrically controlled solid-state switch and a double-pole, double-throw mechanical switch in a first position connecting the hot-water valve to the solid-state switch and the cold-water valve to continuous power, and in a second position connecting the cold-water valve to the solid-state switch and the hot-water valve to continuous power. A temperature control, such as a knob, is manipulable by a user to provide a temperature command electrical signal and to switch the mechanical switch between the first and second positions. A control circuit receives the temperature command electrical signal and provides a control signal to the solid-state switch to control power to one of the hot-water valve and cold-water valve depending on the switch position.

It is thus an object of one embodiment of the invention to permit a single solid-state switch to provide a full range of temperature control. It is another object of one embodiment of the invention to allow the use of a microprocessor with one fewer control output lines.

The automatic temperature control may further include a temperature sensor positionable within the controlled temperature water to provide a water temperature electrical signal indicating a temperature of the controlled temperature water. The control circuit receives the temperature command electrical signal and water temperature electrical signal to control the solid-state switch.

It is thus an object of one embodiment of the invention to provide for precise temperature regulation through feedback control.

The temperature control may be a rotary switch providing contacts communicating with resistors to provide the temperature command electrical signal and having contacts providing the double-pole, double-throw electrical switch.

It is thus an object of one embodiment of the invention to provide a routing switch using the same switching mechanism that generates the temperature command electrical signal.

The temperature control may be a rotatable knob.

It is thus an object of one embodiment of the invention to provide an automatic temperature control compatible with normal washer control operators.

The resistors communicating with the rotary switch may be part of a resistor ladder having taps communicating with poles of the rotary switch to provide a voltage based on rotary switch position.

It is thus an object of one embodiment of the invention to provide a simple method of generating a range of temperature command electrical signals using a switch structure.

The resistor ladder may receive a wash/rinse switched input changing a biasing of the resistor ladder to generate different temperature command electrical signals for a single switch position of the rotary switch depending on the state of the wash/rinse switched input.

It is thus an object of one embodiment of the invention to allow a single digital to analog input of a microprocessor to be used to receive a temperature command by electrically combining a switch position of the rotary switch and a switch position of the wash/rinse switch in the resistor ladder.

The control circuit may be a microprocessor receiving the temperature command electrical signal at a first input and the water temperature electrical signal at a second input and having an output connected to the solid-state electrical switch.

It is thus an object of one embodiment of the invention to provide a system that reduces the number of I/O lines of a microprocessor allowing a microprocessor to be practically used in this application.

The solid-state electrical switch is a triac.

It is thus an object of one embodiment of the invention to permit the use of a triac and its necessary driving circuitry in an automatic temperature control in a cost-effective manner.

The automatic temperature control may include a printed circuit board and the triac, microprocessor, double-pole, double-throw electrical switch may be mounted on the circuit board and the rotary switches formed using contacts formed as printed circuit traces on the printed circuit board.

It is thus an object of one embodiment of the invention to permit a reduced parts count by combining each of these functional components into a single printed circuit board and package.

In a second embodiment, the present invention provides an integrated automatic temperature control that employs two comparators controlling solid-state switch elements controlling the hot and cold-water valves. Control voltages to the comparators are developed that effectively move the comparators between a full on, full off, and switched states eliminating the need for a high current switch contact providing current directly to the hot and cold-water valves. This approach allows the control voltages to be generated using a versatile printed circuit board switch without the need for high current switch contacts and permitting integration of the entire temperature control on a single printed circuit board Specifically, this embodiment provides automatic temperature control for the purposes described above and having a temperature sensor positionable within the controlled temperature water to provide a water temperature electrical signal indicating a temperature of the controlled temperature water. A first and second electrically controlled solid-state switch communicate with the hot-water valve and cold-water valve respectively and a first and second comparator circuit provide control signals to the first and second electrically controlled solid-state switches and receive the water temperature electrical signal at a first input of each of the first and second comparator circuits. A printed circuit board provides a multi-pole switch having printed circuit contacts for communicating with a second input of each of the first and second comparator circuits and selectively with a least three different voltage reference sources and a temperature control manipulable by a user to operate the multi-pole switch that moves the multi-pole switch among: (a) a valve-on state outputting to the comparator a first voltage reference outside an expected range of the water temperature electrical signal to cause a connected comparator to switch its associated valve constantly on; (b) a valve-off state outputting to the comparator a second voltage reference outside the expected range of the water temperature electrical signal to cause a connected comparator to switch its associated valve constantly off; and (c) a valve-switched state outputting to the comparator a third voltage reference within the expected range of the water temperature electrical signal to cause a connected comparator to switch its associated valve on and off to control a temperature of the controlled temperature water.

It is thus an object of one embodiment of the invention to allow high current hot and cold-water valves to be controlled solely by low power switch contact suitable for a printed circuit board.

The first and second solid-state switch and the first and second comparator circuit may be mounted on the printed circuit board to communicate with the multi-pole switch via traces of the printed circuit board.

It is thus an object of one embodiment of the invention to allow multiple functions of temperature selection and temperature control to be integrated onto a single printed circuit board.

These particular features and advantages may apply to only some embodiments falling within the claims and thus do not define the scope of the invention.

DETAILED DESCRIPTION OF THE INVENTION

Figure 1:
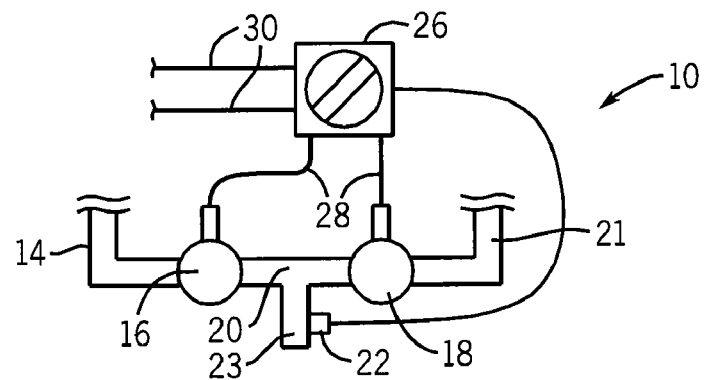
FIG. 1 is a simplified depiction of the hot and cold valve and mixer used in a standard washing machine as may be controlled by the automatic temperature controller of the present invention.

Referring now to FIG. 1, a washing machine 10 may provide a tub 12 for holding clothing, washing water and detergent 13. The tub 12 shown is for a top-loading machine; however the present invention is equally applicable to front-loading washing machines 10.

A hot-water line 14 may be received by a hot-water valve 16 having a solenoid actuator to fully open and fully close the hot-water valve 16 with the application of or removal of electrical power, typically 110 V AC. The output of the hot-water valve 16 leads to a mixer tee 20 having a mixed water outlet 23 to the tub 12. A second branch of the mixer tee 20 receives output from a cold-water valve 18 in turn connected to a cold-water line 21.

The mixed water outlet 23 of the mixer tee 20 leading to the tub 12 may include a temperature sensor 22 sensing the temperature of mixed water from the hot-water valve 16 and cold-water valve 18. The temperature sensor 22 may be a thermistor or the like. An electronic signal from this temperature sensor 22 is received by an automatic temperature controller 26 of the present invention which also provides electrical connections 28 to the hot-water valve 16 and cold-water valves 18 respectively. The automatic temperature controller 26 also receives line power 30.

Microprocessor-Based Automatic Temperature Control

Figure 2:
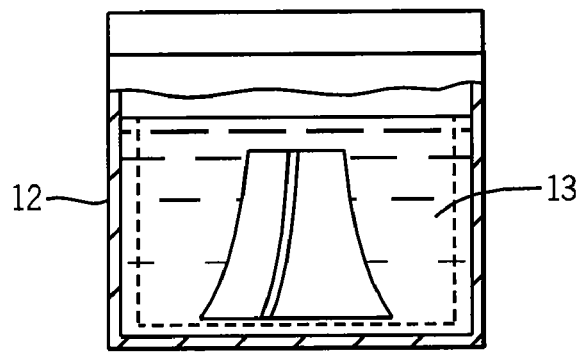
FIG. 2 is a simplified block diagram of a prior art microprocessor-based automatic temperature controller using two triacs.
Figure 2:
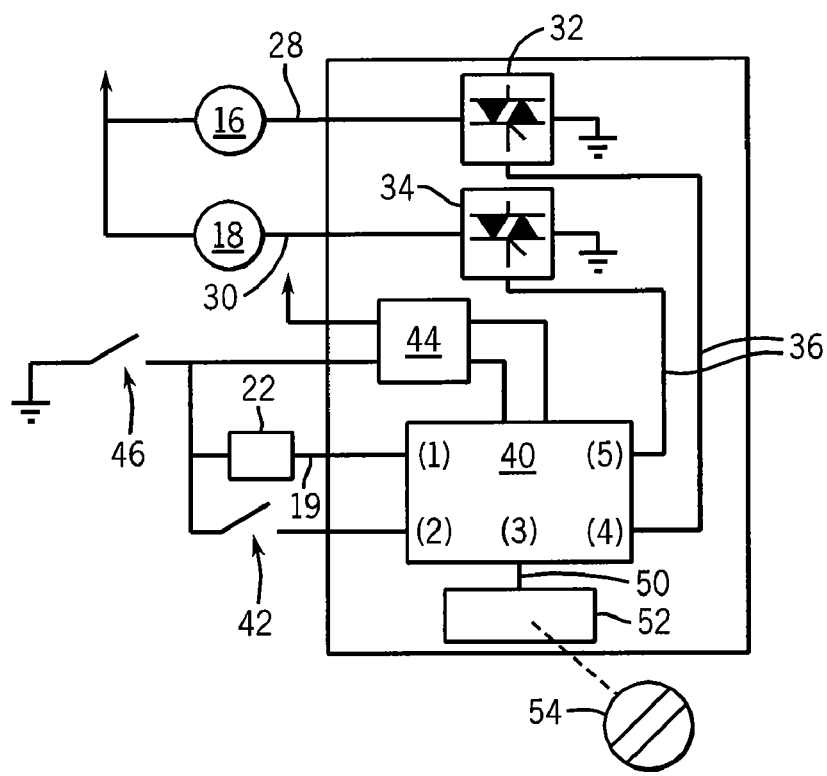

Referring now to FIG. 2, a prior art automatic temperature controller, as described above in the Background of the Invention, may provide a first triac 32 switching power to the hot-water valve 16 and a second triac 34 switching power to the cold-water valve 18. Triac control circuitry, as will be understood in the art, is not shown. This power switching is accomplished by grounding electrical connections 28 to the hot-water valve 16 or cold-water valve 18, however this polarity may readily be reversed in an alternative embodiment.

Control signals 36 to the triacs 32 and 34 may be generated by two different outputs (4) (5) from a microprocessor 40 to independently switch the hot-water valve 16 and cold-water valve 18 on and off. The switching pattern of the hot-water valve 16 and cold-water valve 18 controls the temperature of water from the mixed water outlet 23 based on a temperature sensing signal received by an analog to digital input (1) to the microprocessor 40 from the temperature sensor 22. As is understood in the art, analog to digital inputs convert analog voltages to a digital binary input that may be processed by the microprocessor 40 using stored firmware.

The microprocessor may also receive a temperature command signal 50 at a second analog to digital input (3) of the microprocessor 40. This temperature command signal 50 may be received from a potentiometer 52 actuated by a temperature control operator 54 normally in the form of a knob. The microprocessor 40 may also receive a signal from a wash/rinse switch 42 (typically elsewhere on the washing machine 10) at a binary input (2) and may receive power from a power supply 44 typically switched on and off by a cycle timer switch 46 to be on during periods when water flow should occur.

As will be described below with respect to FIGS. 3, 4 and 5, the automatic temperature controller 26 of the present invention eliminates one of the triacs 32 and 34 and simplifies the microprocessor 40 reducing its number of inputs and outputs by two.

Figure 3:
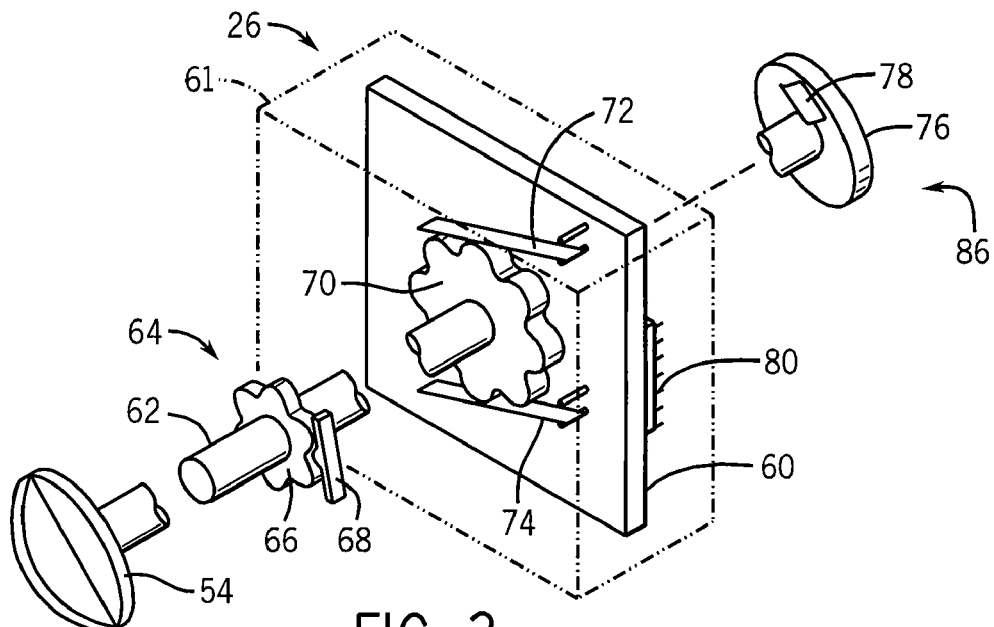
FIG. 3 is an exploded perspective view of the automatic temperature controller of the present invention showing the incorporation of the temperature control switch and control circuitry on a single circuit board and showing a mechanical detent and steering switch assembly.

Referring now to FIG. 3, the present invention provides an automatic temperature controller 26 incorporating a single printed circuit board 60 supporting the principal mechanical and electrical elements of the automatic temperature controller 26. These mechanical elements include the temperature control operator 54 which may communicate with a shaft 62 having a detent assembly 64 comprised of a gear structure 66 on the shaft 62 and a corresponding flexible pawl 68. The detent assembly 64 causes rotation of the temperature control operator 54 to be stable only in fixed positions corresponding to switch positions as will be described. The shaft 62 may also communicate with a switch cam 70 moving the poles of two single-pole, double-throw switches 72 and 74 when the temperature control operator 54 is rotated.

The shaft 62 passes through a hole in the printed circuit board 60 providing a bearing for that shaft 62 together with bearings formed in a surrounding housing 61. The end of the shaft 62 is received by a hub 76 on the opposite side of the printed circuit board 60 that supports conductive wiper fingers 78. With rotation of the temperature control operator 54 the wiper fingers 78 short switch contacts 86 formed of printed circuit traces on the underside of the printed circuit board 60 to provide a potentiometer like structure to be described.

The printed circuit board 60 may also include a terminal strip 80 allowing it to be connected via a wiring harness (not shown) to other components of the washing machine 10 such as the valves 16 and 18, a wash/rinse switch, power, etc.

Figure 4:
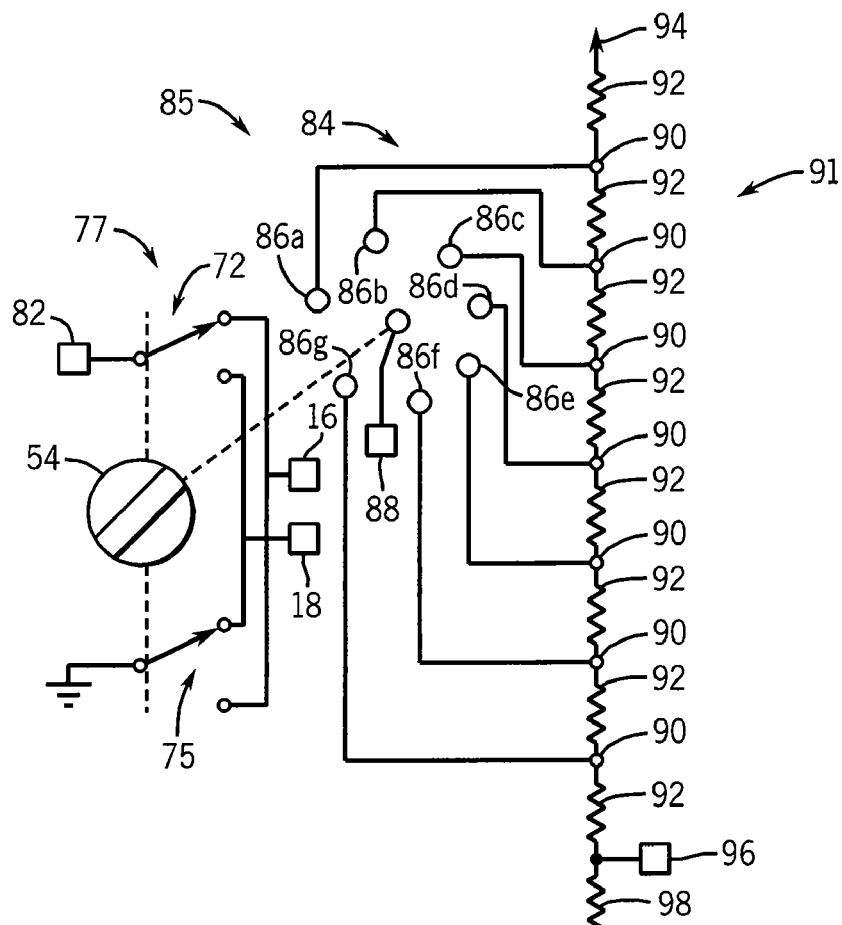
FIG. 4 is a schematic diagram of a temperature control switch used to provide a temperature command signal and control steering switches used to connect one triac to either of the two hot and cold-water valves.

Referring now to FIGS. 3 and 4, rotation of the temperature control operator 54 causes switching of two switches: single-pole double throw switch 72 and single-pole double throw switch 74 each communicating with the temperature control operator 54 by means of switch cam 70. The pole of switch 75 may be connected to ground and the pole of switch 72 may be connected to control input of a triac 82. The two throws of each of the switches 72 and 75 connect one to the hot-water valve 16 and one to the cold-water valve 18 respectively. Switches 72 and 75 change state in unison to together provide for two states: a first one, as shown, connecting the pole of switch 72 to a throw connected to hot-water valve 16 and the pole of switch 75 connecting to cold-water valve 18. The opposite state (not shown in FIG. 4) connects the pole of switch 75 to the throw connected to hot-water valve 16 and the pole of switch 72 to the throw connected to the cold-water valve 18. The combination of switches 72 and 75 create steering switch assembly 77.

Temperature control operator 54 also connects with a rotary switch 84 formed from the wiper fingers 78 (forming the switch pole) and multiple throws formed by contacts 86*a*-86*g*. The pole follows rotary switch 84 that may be connected to an analog to digital input (2) of the microprocessor 88 as will be described. Both of these components together comprise a switch assembly 85.

Each of the contacts 86 connects to one tap 90 formed at junctions between series connected resistors 92 arranged in a resistor ladder 91 so that when the resistor ladder 91 spans a DC voltage, each tap 90 provides a different voltage level. Thus, rotation of the switch 84 causes different voltage to be communicated to the microprocessor 88 corresponding generally with a user entered temperature setting.

One end of the resistor ladder 91 connects correctly to DC power 94 generated by a power supply 44 and the other end of the ladder 91 is connected to a terminal 96 connectable to a wash/rinse switch and to a resistor 98 leading to ground. As will be discussed below, a shorting of the terminal 96 to ground essentially shunts resistor 98 changing the voltages at each of the taps 90 as may be desired to provide for wash and rinse cycles with different water temperatures.

Figure 5:
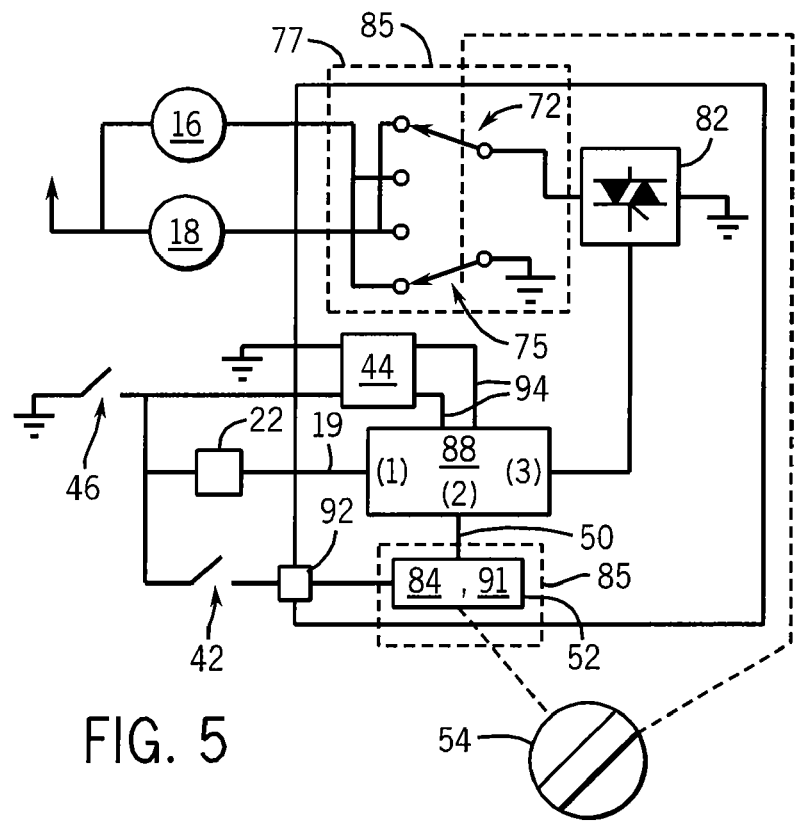
FIG. 5 is a figure similar to that of FIG. 3 showing a circuit incorporating the temperature control switch of FIG. 4 using a single triac.

Referring now to FIG. 5, the automatic temperature controller 26 of the present invention eliminates one of the triacs 32 and 34 of the embodiment of FIG. 2 and simplifies the microprocessor 40 reducing its number of inputs and outputs by two. Thus, in this embodiment of the present invention, the microprocessor 88 may receive only two signals, one indicating water temperature from temperature sensor 22 via pin (1), and the second providing the temperature command signal 50 from the switch 84 and resistor ladder 91 forming part of switch assembly 85.

Wash/rinse information from wash/rinse switch 42 may be provided to the microprocessor by altering the temperature command signal 50 through adjustment of the bias resistor 98 in the resistor ladder 91 of FIG. 4 through terminal 96 as has been described. This modification effectively combines the effect of the rotation position of operator 54 and the switch position of the wash/rinse switch 42.

Other than power supply lines, only one additional line is required from microprocessor 88, that being output line (3) connected to the control input of a single triac 82. The triac 82 may apply power through the pole of switch 72 (by grounding that pole) to either of the hot-water valve 16 and the cold-water valve 18. During these connections, the other valve 16 or 18 is grounded to provide for a constant current flow there through by means of switch 75. Thus, to produce a warm temperature of water through mixed water outlet 23 (shown in FIG. 1), the hot-water valve 16 may be constantly on (connected to ground via switch 75) and the cold-water valve 18 operated intermittently (connected to the triac 82 by switch 72) to cool the resulting mixed water. Conversely, for cool temperatures the opposite approach may be provided with the cold-water valve on constantly (connected to ground via switch 75) and the hot-water valve operated intermittently (connected to the triac 82 by switch 72) to control the temperature. This temperature control is a feedback control based on information from the temperature sensor 22 received by the microprocessor 88.

In this way a full range of precise temperature control of filling water at maximum filling speeds is obtained with a single triac 82 and a reduced pin count is required of the microprocessor 88 significantly reducing the cost of the overall circuit.

Automatic Temperature Control Using PCB Switch

Figure 6:
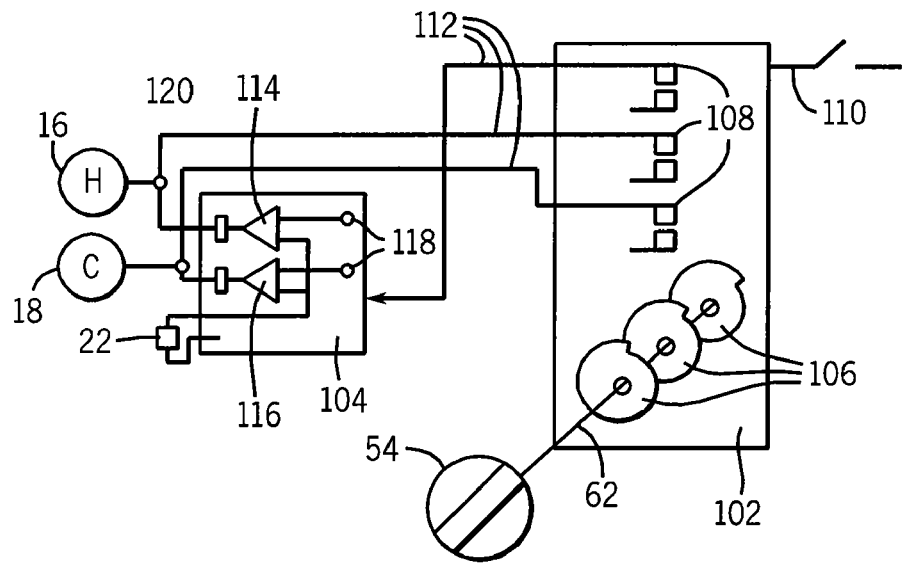
FIG. 6 is a simplified block diagram of a prior art implementation of an automatic temperature control system using two comparators and high current override switches.

Referring now to FIG. 6, an alternative prior art automatic temperature controller 260 may provide for an interconnected switch-board 102 and comparator-board 104 controlling hot-water valve 16 and cold-water valve 18. The switch-board 102 may have a temperature control operator 54 for communicating with a series of cams 106 to rotate the cams 106 to cause a switching of high current contacts 108 having special arc resistant contact material on a flexible conductive leaf spring flexed by the cams 106 according to techniques well known in the art.

The switch-board 102 may receive electrical power and signals from a harness 110 connecting to other portions of the washing machine 10, for example a timer switch (not shown), and provide outputs from contacts 108 to the comparator-board 104 and to the hot-water valve 16 and cold-water valve 18 through harness 112 leading to the comparator-board 104.

Generally, the comparator-board 104 will have first and second comparators 114 and 116 operating to compare voltages between the two inputs of each comparator to produce a high or low output depending on the relative magnitude of the voltages on their two inputs as understood in the art. Each comparator 114 and 116 may receive a reference voltage 118 at one input and at their other input may receive a voltage from temperature sensor 22. Generally the voltage from the temperature sensor 22 rises as the temperature falls.

The output of each of the comparators 114 and 116 may connect to a solid-state switching device such as a triacs 120, the latter providing control of the high current necessary to activate hot-water valve 16 and cold-water valve 18. Generally, the operation of the comparators 114 and 116 is to switch their respective hot-water valve 16 and cold-water valve 18 on and off to provide a temperature of the water from mixed water outlet 23 as monitored by the temperature sensor 22 matching a desired temperature indicated by reference voltage 118.

When mixed hot and cold-water is not desired, high current contacts 108 of the switch-board 102 may remove power from the comparator-board 104 and may bypass the comparator-board 104 by providing power directly through switch contacts 108 to either of the hot-water valve 16 and cold-water valve 18. This direct control of the hot-water valve 16 and cold-water valve 18 requires high current flows necessitating high current contacts 108.

Figure 7:
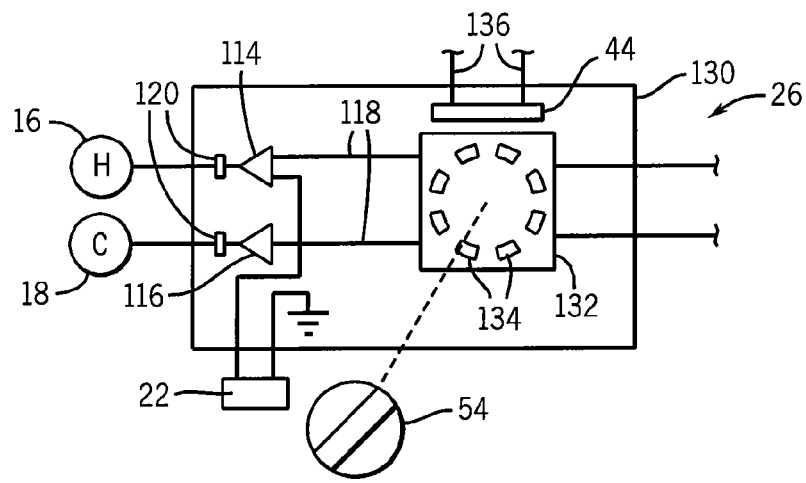
FIG. 7 is a block diagram similar to that of FIG. 6, showing the elimination of high current override switches in favor of low current printed circuit board switches for control of the valves.

Referring now to FIG. 7, in the present invention a single printed circuit board 130 may hold the comparators 114 and 116 and triacs 120 together with a printed circuit board switch 132 fabricated on the printed circuit board 130 and providing the reference voltages 118 directly to the comparators 114 and 116. The printed circuit board switch 132 employs a series of contacts 134 constructed of the traces of the printed circuit board. This construction permits versatile switch architectures, however only low switch currents. For this reason, the printed circuit board switch 132 may provide reference voltages 118 to the comparators 114 and 116 (which have high input impedances) but may not conduct the currents to switch the hot-water valve 16 or cold-water valve 18.

In order to override the comparators 114 and 116 when hot or cold-water is desired (without mixing), the present invention provides out of range voltage signals to comparators 114 and 116 effectively disabling them in a full on or full off state.

Figure 8:
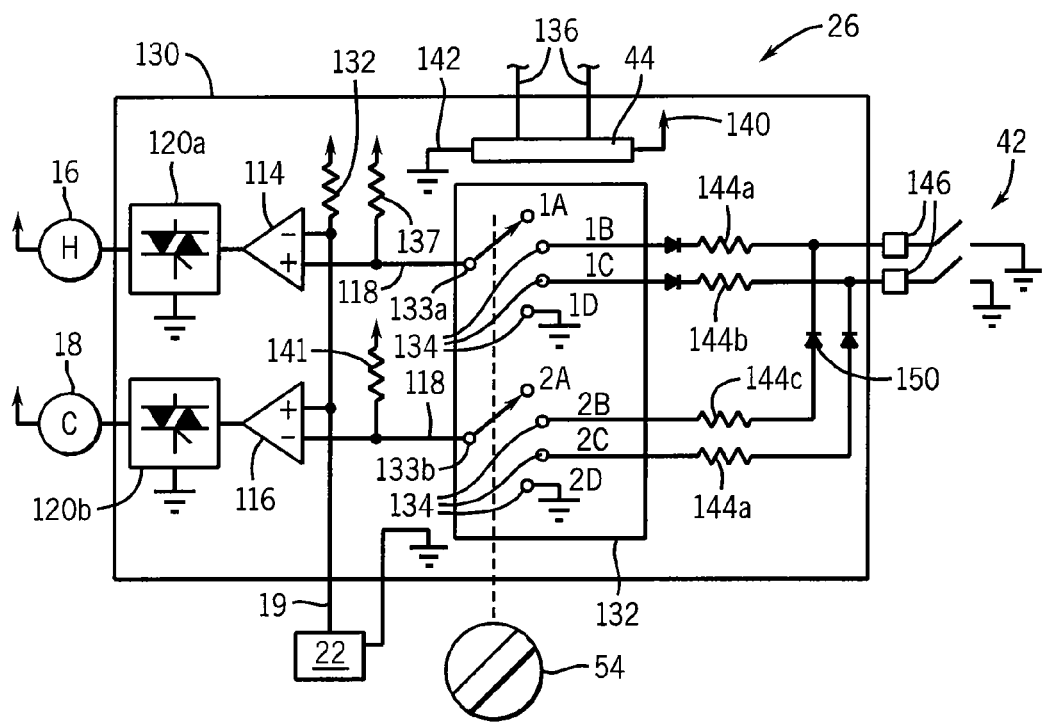
FIG. 8 is a schematic representation of FIG. 7.

Referring now to FIG. 8, the printed circuit board 130 may also include power supply 44 receiving line voltage 136 to provide for a DC voltage, for example through the use of a rectifier and filter capacitor as is well understood in the art. The power supply circuitry thereby produces a DC voltage 140 referenced to a local ground 142. The DC voltage 140 and ground 142 may be used to power the comparators 114 and 116 and provide the voltage references 118.

The inverting input of comparator 114 and the positive input of comparator 116 are connected together to the DC voltage 140 through a biasing resistor 137 and further connected to the temperature sensor 22 whose remaining terminal may be grounded. In this way, the inverting input of comparator 114 and positive input of comparator 116 receive a sensed temperature signal 19 proportional to the temperature of the mixed water (with higher temperatures equating to lower voltages).

The positive input of comparator 114 is connected to a biasing resistor 137 and to a pole 133a of the printed circuit board switch 132. This pole 133a may in turn contact one of four throws formed by contacts 134 constructed of printed circuit board pads and labeled 1A-1D. Similarly, the inverting input of comparator 116 may connect to biasing resistor 141 and to a second pole 133b of printed circuit board switch 132 which may in turn contact one of four throws formed by printed circuit contacts 134 labeled 2A-2D and electrically independent of throws 1A-1D.

Movement of the poles 133a and 133b through manipulation of the temperature control operator 54 allows three different reference voltage states to be obtained, each providing different reference voltages 118 to comparators 114 and 116. These states are intended to represent the flexibility of the present invention and may not all be used in a specific washing machine.

The first state, as shown in FIG. 8, connects the poles 133a or 133b to an open circuit (e.g. 1A, or 2A) creating a reference voltage 118 at an effective resistor divider having only a single biasing resistor 137 or 141 to produce a reference voltage equal to the DC voltage 140. The DC voltage 140 will typically be above the highest range obtained by the sensed temperature signal 19 of the temperature sensor 22 when measuring the water temperature at mixed water outlet 23, and thus will cause the output of comparator 114 to move to a high state turning off triac 120a and hot-water valve 16 continuously. Likewise, this voltage will cause the output of comparator 116 to fall to a low state turning on triac 120b and thus turning on cold-water valve 18 to provide for undiluted cold-water at mixed water outlet 23.

In a second state, the poles 133a or 133b may connect to a throw (for example 1B, 1C, 2B, 2C) connected to resistors 144a-144d in turn connected to ground either directly or by connection to a terminal 146 in turn connecting to an off-board wash/rinse switch 42 connectable to ground. The resistors 144a-d work together with biasing resistor 137 and 141 to form a resistive divider providing an arbitrary predefined reference voltage 118 that may be used to designate any particular water temperature between the temperature of the hot and cold supply. In this state, as the sensed temperature signal 19 of the temperature sensor 22 rises in voltage (indicating a decrease in water temperature), hot-water valve 16 will turn on and cold-water valve 18 will turn off, and when the sensed temperature signal 19 falls in voltage (indicating an increase in water temperature), hot-water valve 16 will turn off and cold-water valve 18 will turn on. The precise temperature at which this switching occurs is determined by the voltage set by the resistors 144a-d. Thus, it will be understood that a variety of different reference voltages 118 and temperature set points may be generated including those controlled by external switches such as the wash/rinse switch 42.

Diodes 150 may be installed in series with resistors 144 so that those resistors 144 may be joined to a common contact of wash/rinse switch 42 without "sneak circuits" forming, for example, in which current through a biasing resistor 141 passes backward from biasing resistor 141 through printed circuit board switch 132 to affect the reference voltage 118 received by comparator 114.

In a third state, the poles 133a and 133b may connect to throws (e.g. 1D, 2D) that are grounded. The ground voltage is also outside of the range normally expected of sensed temperature signal 19 but this time causing the output of comparator 114 to move to a low state turning on triac 120a and hot-water valve 16 continuously. Likewise, this voltage will cause the output of comparator 116 to rise to a high state turning off triac 120b and thus turning off cold-water valve 18 to provide for undiluted hot-water at mixed water outlet 23.

Figure 10:
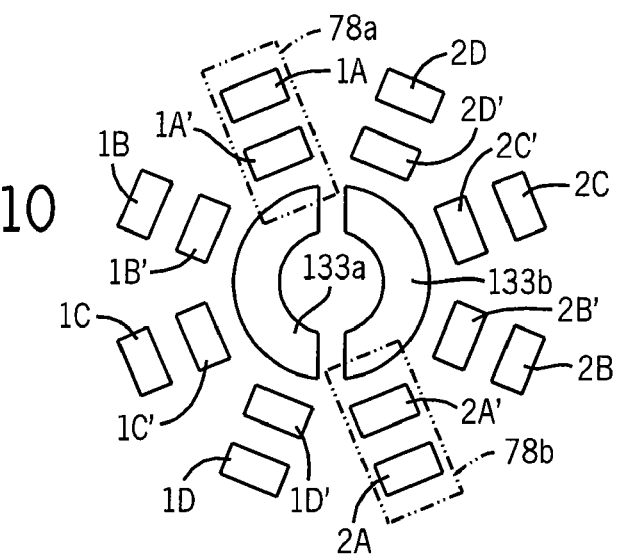
FIG. 10 is a plan view of a printed circuit board trace pattern suitable for use with the present invention.
Figure 11:
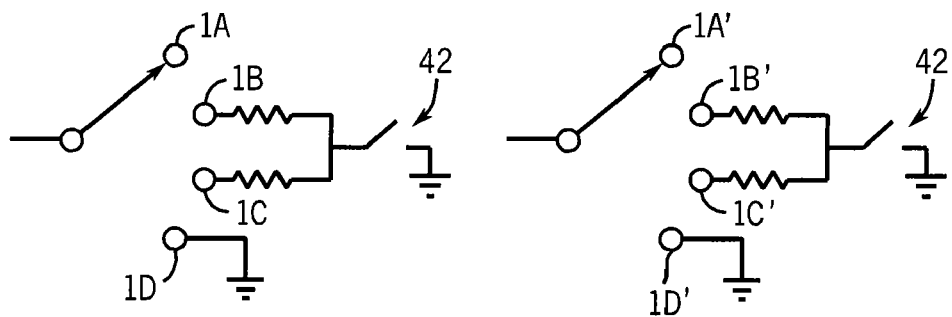
FIG. 11 is a schematic representation of the printed circuit board pattern of FIG. 10.

Referring now to FIGS. 10 and 11, additional flexibility in setting different voltages, for example for the wash and rinse cycle, may be provided by adding an additional set of throws (e.g. 1A'-1D') for each pole 133c and 133b, with each given set of throws associated with one of a wash or rinse cycle contact in wash/rinse switch 42. Referring to FIG. 10, these extra throws may be simply realized by adopting a radial trace pattern in which wiper fingers 78a and 78b selectively short a center bifurcated ring conductor forming poles 133a and 133b with circumferential contacts 134 in providing the throws in successive rings a separate wash and rinse contact. The ability to use low voltage printed circuit board based switches allow a complicated switch pattern to be simply and inexpensively implemented on the printed circuit board 130.

Figure 9:
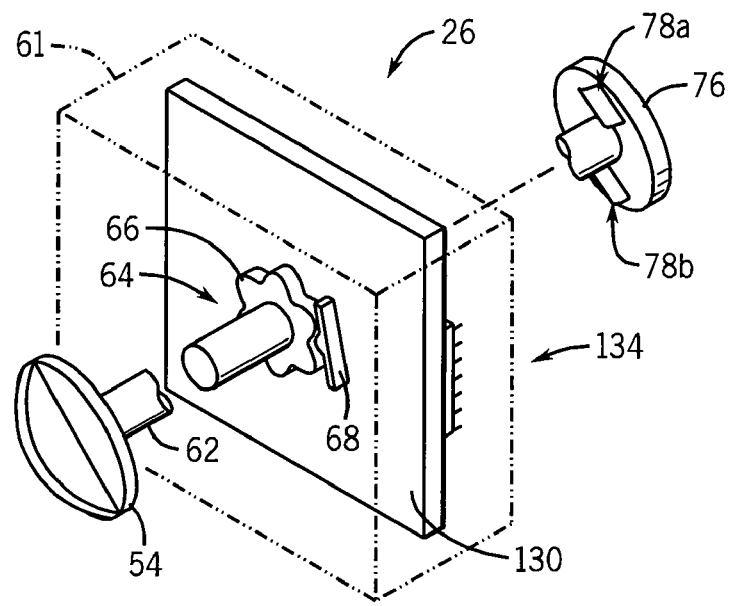
FIG. 9 is a figure similar to that of FIG. 3 eliminating the steering switches of the previous embodiment.

Referring now to FIGS. 8 and 9, the printed circuit board 130 may support the principal mechanical and electrical elements of the automatic temperature controller 26. As before, a temperature control operator 54 may communicate with a shaft 62 having a detent assembly 64 comprised of a gear structure 66 on the shaft 62 and a corresponding flexible pawl 68. The shaft 62 passes through a hole in the printed circuit board 130 providing a bearing for that shaft 62 along with bearing surface formed in plastic housing 61. The shaft 62 passes through the printed circuit board 130 to be received by a hub 76 on the opposite side of the printed circuit board 60 that includes wiper fingers 78a and 78b communicating with switch contacts 134 formed of printed circuit traces on the underside of the printed circuit board 130. The printed circuit board may also include a terminal strip 80 allowing it to be connected to a harness of the washing machine 10 connecting to the valves and other washing machine components.

The term double-pole, double-throw switch should be understood to include two single-pole double throw switches operating in tandem as well as switches having additional poles and throws so long as they have at least two poles and two throws as well as other functionally equivalent switches.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It is also understood that the invention disclosed and defined herein extends to all alternative combinations of two or more of the individual features mentioned or evident from the text and/or drawings. Of these different combinations constitute various alternative aspects of the present invention. The embodiments described herein explain the best modes known for practicing the invention and will enable others skilled in the art to utilize the invention.

We claim:

1. An automatic temperature control for a washing machine providing controlled temperature water to a washing chamber by control of a hot-water valve connected to a hot-water line and a cold-water valve connected to a cold-water line, where outputs of the hot-water valve and cold-water valve are mixed to provide a desired temperature of water to the washing chamber, the automatic temperature control comprising:

an electrically controlled solid-state switch;

a double-pole, double-throw mechanical switch in a first position connecting the hot-water valve to the solid-state switch and the cold-water valve to continuous power, and in a second position connecting the cold-water valve to the solid-state switch and the hot-water valve to continuous power;

a temperature command input manipulable by a user to provide a temperature command electrical signal and to switch the mechanical switch between the first and second positions; and a control circuit receiving the temperature command electrical signal and providing a control signal to the solid-state switch to control power to one of the hot-water valve and cold-water valve depending on the switch position;

whereby a single solid-state switch may provide a full range of temperature control.

2. The automatic temperature control of claim 1 further including a temperature sensor positionable within the controlled temperature water to provide a water temperature electrical signal indicating a temperature of the controlled temperature water;

and wherein the control circuit receives the temperature command electrical signal and water temperature electrical signal to control the solid-state switch.

3. The automatic temperature control of claim 2 wherein the control circuit is a microprocessor receiving the temperature command electrical signal at a first input and the water temperature electrical signal at a second input and having an output connected to the solid-state electrical switch.

4. The automatic temperature control of claim 1 wherein the temperature command input is a rotary switch providing contacts communicating with resistors to provide the temperature command electrical signal, the rotary switch further having contacts providing the double-pole, double-throw electrical switch.

5. The automatic temperature control of claim 4 wherein the temperature command input provides a rotatable knob.

6. The automatic temperature control of claim 4 wherein the resistors provide a resistor ladder having taps communicating with poles of the rotary switch to provide a voltage based on rotary switch position.

7. The automatic temperature control of claim 6 wherein the resistor ladder may receive a wash/rinse switched input changing a biasing of the resistor ladder to generate different temperature command electrical signals for a single switch position depending on the state of the wash/rinse switched input.

8. The automatic temperature control of claim 1 wherein the solid-state electrical switch is a triac.

9. The automatic temperature control of claim 1 wherein the automatic temperature control includes a printed circuit board and wherein the electrically controlled solid-state switch is a triac mounted on the circuit board, the control circuit is a microprocessor mounted on the circuit board, the double-pole, double-throw electrical switch is mounted on the circuit board, and the temperature command input is a rotary switch formed using contacts formed as printed circuit traces on the printed circuit board.

\* \* \* \* \*